United States Patent
Matsumura et al.

(10) Patent No.: US 6,902,587 B2
(45) Date of Patent: Jun. 7, 2005

(54) METHOD FOR MANUFACTURING ELECTRODE PLATE GROUP FOR PRISMATIC BATTERY

(75) Inventors: Jun Matsumura, Otsu (JP); Kohei Suzuki, Yao (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 282 days.

(21) Appl. No.: 10/013,513

(22) Filed: Dec. 13, 2001

(65) Prior Publication Data

US 2002/0106556 A1 Aug. 8, 2002

(30) Foreign Application Priority Data

Dec. 13, 2000 (JP) ........................................ 2000-378716

(51) Int. Cl.[7] .............................. H01M 6/00; H01M 6/46
(52) U.S. Cl. ...................................... 29/623.3; 429/152
(58) Field of Search ........................... 29/623.3; 429/152

(56) References Cited

U.S. PATENT DOCUMENTS 3,708,349 A * 1/1973 Macaulay et al. ......... 29/623.3

5,007,467 A 4/1991 Nelles

FOREIGN PATENT DOCUMENTS

| JP | 11154531 | 6/1999 |
| JP | 11-154531 | 6/1999 |

OTHER PUBLICATIONS

English Language Abstract of JP 11–154531.

* cited by examiner

Primary Examiner—Patrick Joseph Ryan
Assistant Examiner—Julian Mercado
(74) Attorney, Agent, or Firm—Greenblum & Bernstein, P.L.C.

(57) ABSTRACT

A method for manufacturing an electrode plate group for a prismatic battery includes the steps of manufacturing a large plate from which a plurality of single electrode plates that form the electrode plate group are cut, cutting a plurality of single electrode plates from the large plate, stacking the single electrode plates by grouping together single electrode plates from different positions on the large plates, and forming the electrode plate group by successively taking single electrode plates from the stacked single electrode plates and alternately stacking the taken single electrode plates with single electrode plates of the opposite polarity.

4 Claims, 6 Drawing Sheets

| | Pattern 1 | Pattern 2 | Pattern 3 | Pattern 4 |
|---|---|---|---|---|
| Rotational axis X | 180° rotation | Fixed | 180° rotation | Fixed |
| Rotational axis Y | 180° rotation | 180° rotation | Fixed | Fixed |
| Rorational axis Z | Fixed | Fixed | 180° rotation | 180° rotation |
| Loading arrangement | 22c 22g<br>22d 22h<br>22f 22b<br>22e 22a | 22f 22b<br>22e 22a<br>22c 22g<br>22d 22h | 22h 22d<br>22g 22c<br>22a 22e<br>22b 22f | 22a 22e<br>22b 22f<br>22h 22d<br>22g 22c |

METHOD FOR MANUFACTURING ELECTRODE PLATE GROUP FOR PRISMATIC BATTERY

The present disclosure relates to subject matter contained in priority Japanese Patent Application No. 2000-378716, filed on Dec. 13, 2000, the contents of which is herein expressly incorporated by reference in its entirety.

BACKGROUND OF THE INVENTION

1. Field of the Invention

The present invention relates to a method for manufacturing an electrode plate group for a prismatic battery, and more particularly to a method for manufacturing an electrode plate group having little variation in weight at low cost and with high productivity.

2. Description of Related Art

In a prismatic battery, an electrode plate group is formed by stacking rectangular-shaped positive electrode plates and negative electrode plates with separators interposed therebetween. This electrode plate group is accommodated in a prismatic battery case along with an electrolyte, and an opening at the top of the battery case is closed by a lid having a safety vent.

Electrode plates such as positive electrode plates and negative electrode plates need to be mass-produced since a number of electrode plates are used in each cell. If such electrode plates were to be manufactured individually, this would result in extremely poor productivity. Accordingly, single electrode plates are normally produced by manufacturing a large plate from which a plurality of electrode plates are cut and then simultaneously cutting out a number of single electrode plates from the large plate.

When single electrode plates are manufactured from a large plate, however, it is extremely difficult to avoid variations in the distribution of active materials between different positions on the large plate. As a result, when a plurality of single electrode plates are simultaneously cut from a large plate and the electrode plates are stacked without adjusting the positional arrangement of the electrode plates, the amount of active materials in the sets of plates formed by the stacked electrode plates will differ depending on where the single electrode plates were positioned on the large plate. When plates in such sets of plates are stacked alternately with single electrode plates of the opposite polarity to form an electrode plate group, there can be large variations in the weight of the positive electrodes or negative electrodes in the resulting electrode plate groups depending on where the single electrode plates in the sets of electrode plates were positioned on the large plate. As one example, when an electrode plate group is formed by stacking the heaviest positive electrode plates, the lightest negative electrode plates and separators, there will be a marked imbalance in capacity between the positive and negative electrodes. This leads to poor absorption of gas during charging, resulting in a rise in internal pressure and a risk of the battery leaking. Alternatively, this may lead to the safety vent opening frequently, resulting in a reduction in the cycle life of the battery due to a decrease in the amount of electrolyte, etc. Japanese Laid-Open Patent Publication No. Hei. 11-154531 teaches one example of a method for manufacturing electrode plate groups with a similar capacity so as to overcome the above problem. In the disclosed method, the weights of single electrode plates are measured and the single electrode plates are then sorted according to their weight, with the electrode plates being combined so that the total weight of the single electrode plates composing an electrode plate group is within a predetermined ranges.

Alternatively, after electrode plate groups have been used to produce batteries, it is also possible to sort the batteries according to their capacity and to provide users with groups of batteries that are appropriate for the intended use of the batteries.

However, in order to sort the single electrode plates by weight, a single electrode plate weighing/sorting device for weighing the single electrode plates and then sorting them by weight needs to be set up on a single electrode plate production line. Accordingly, this method has a drawback of increased equipment costs.

In the other case where the electrode plate groups are made into batteries that are then sorted according to capacity, a capacity sorting device is required. This increases equipment costs and there is the further problem of the time required to measure the capacities of batteries, which lowers productivity.

SUMMARY OF THE INVENTION

In the light of the above mentioned problems, an object of the present invention is to provide a method for manufacturing an electrode plate group for a prismatic battery, the electrode plate group having little variation in weight at low cost and with high productivity.

A method for manufacturing an electrode plate group for a prismatic battery according to the invention includes the steps of manufacturing a large plate from which a plurality of single electrode plates that form the electrode plate group are cut, cutting a plurality of single electrode plates from the large plate, stacking the single electrode plates by grouping together single electrode plates from different positions on the large plates, and forming the electrode plate group by successively taking single electrode plates from the stacked single electrode plates and alternately stacking the taken single electrode plates with single electrode plates of the opposite polarity. When stacking the single electrode plates cut from the large plates, single electrode plates from different positions on the large plates are grouped together, so that there is no variation in weight between the sets of stacked single electrode plates. Single electrode plates are successively taken from the stacks and used to form an electrode plate group, the weight of which is therefore within a predetermined range. In addition, by merely having single electrode plates from different positions on the large plates grouped together during stacking, high-output, long-life prismatic batteries are manufactured without requiring a weight sorting device or the like and without increases in equipment costs or decreases in productivity.

An operation, which (i) divides the single electrode plates cut from the large plate into a plurality of different kinds of sets that are each composed of a plurality of single electrode plates and (ii) interchanges the positions of the single electrode plates composing a set by rotating the single electrode plates about a central point, may be performed with a combination of sets that are rotated and an order in which the sets are rotated being successively changed for each large plate so as to interchange the positions of the single electrode plates. A simple, low-cost construction can be used to support and rotate a set of single electrode plates so that single electrode plates from different positions on the large plates are stacked together.

Further, the single electrode plates from different positions on the large plates may be stacked by successively repeating operations with four patterns, the four patterns being produced by combining a first operation where a single set composed of all of the single electrode plates are rotated and a second operation where the single electrode plates in one of two sets, which are each composed of half of the single electrode plates, are rotated. Thereby, single electrode plates from different positions are grouped together using only two operations.

Furthermore, single electrode plates may be alternately taken from two sets of electrode plates that have been stacked from different positions as described above and then used to manufacture an electrode plate group. By doing so, an electrode plate group with less variation in weight is manufactured.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

The following describes the present invention as embodied in a method for manufacturing an electrode plate group for use in a prismatic battery that is a nickel metal hydride rechargeable battery with reference to FIGS. 1 to 6.

Figure 6:
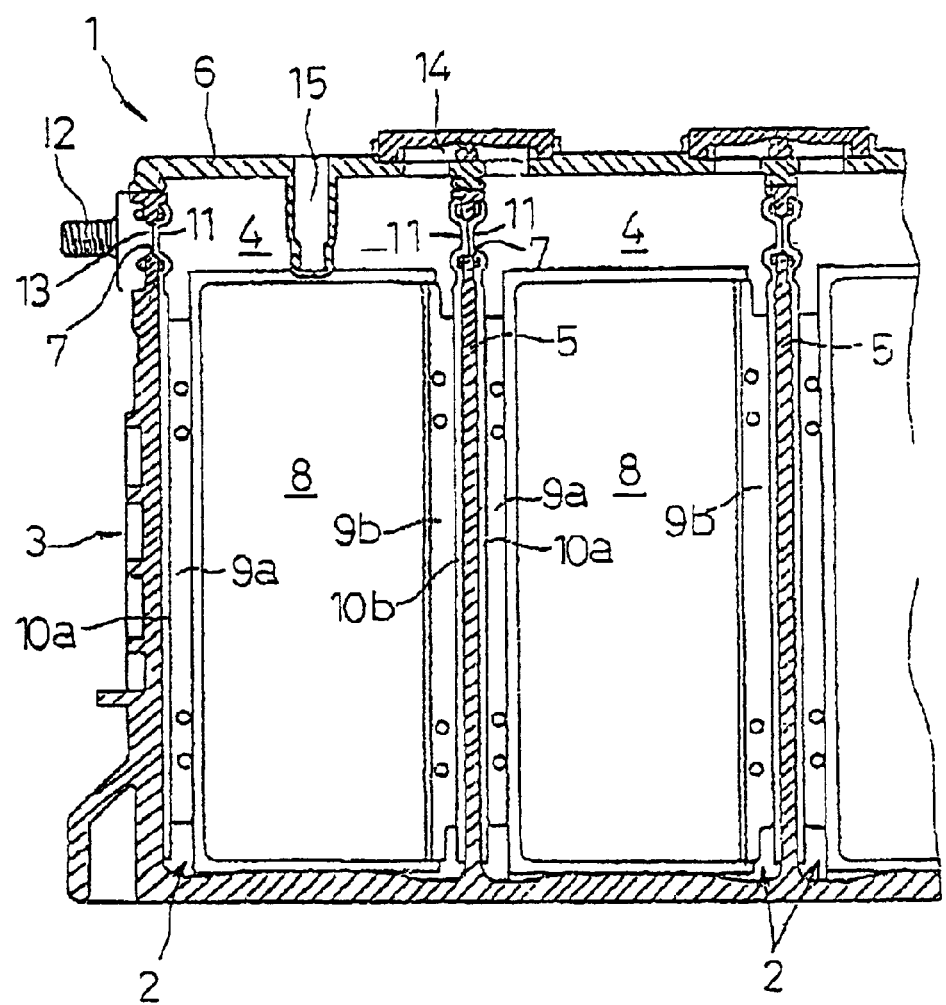
FIG. 6 is a partial cross-sectional front view of a prismatic battery module.

Firstly, the construction of a prismatic battery module 1 that accommodates a plurality of cells 2 is described with reference to FIGS. 6. In the drawing, reference numeral 3 denotes a prismatic battery case that is in the form of a flat rectangular parallelepiped. A plurality of prismatic cell cases 4 for cells 2 having short lateral walls and long lateral walls are connected together to form the prismatic battery case 3. The each pair of cell cases 4 shares short lateral walls thereof as a separation wall 5 of cell cases, and openings of the cell cases 4 are closed by a unitary lid 6. Connection holes 7 are provided on the upper portions of the short lateral walls on the outsides of cell cases 4 positioned at the ends of the prismatic battery module 1 and on the upper portions of the separation walls 5 between the cell cases 4. The cells 2 are formed by placing an electrode plate group 8, formed by stacking rectangular-shaped positive electrode plates and negative electrode plates with intervening separators, in each of the cell cases 4 together with electrolyte. A positive electrode plate and negative electrode plate in the electrode plate group 8 project outward from opposite sides of the electrode plate group 8 to form lead portions 9a and 9b for the positive electrode plates and negative electrode plates. The side edges of the lead portions 9a and 9b are respectively connected, such as by welding, to collector plates 10a and 10b.

Connecting projections 11 that fit into the connection holes 7 are provided so as to project outwards from the upper portions of the collector plates 10a and 10b, with the connecting projections 11 of collector plates 10a and 10b of positive and negative polarities of adjacent cell cases 4 being welded together to connect the collector plates 10a and 10b. A connection terminal 12 of positive or negative electrode is provided in each of the connection holes 7 of the short lateral walls on the outsides of the cell cases 4 positioned at the ends of the prismatic battery module 1. A connecting projection 13 of each connection terminal 12 is connected to the collector plate 10a or 10b by welding. Accordingly, a plurality of cells 2 that are accommodated in the prismatic battery case 3 are connected together in series.

The lid 6 is equipped with a connecting path 14 for keeping the internal pressure of the cell cases 4 even, a safety vent (not shown) for releasing pressure when the internal pressure in the cell cases 4 has reached or exceeded a predetermined value, and a sensor fixing hole 15 for fixing a temperature sensor for detecting a temperature of a cell 2.

The electrode plate group 8 is formed as follows. The positive electrode plate is made such that a nickel foamed metal is plated with a positive electrode material whose main active component is nickel hydroxide. The negative electrode plate is made by applying a negative electrode material, whose main active component is a hydrogen-occluding alloy, onto a punched metal. These positive electrode plates and negative electrode plates are stacked with intervening separators composed of a polypropylene non-woven fabric. Normally, such electrode plate groups 8 are formed by covering the positive electrode plates with bag-like separators and alternating the positive electrode plates and negative electrode plates.

Figure 1:
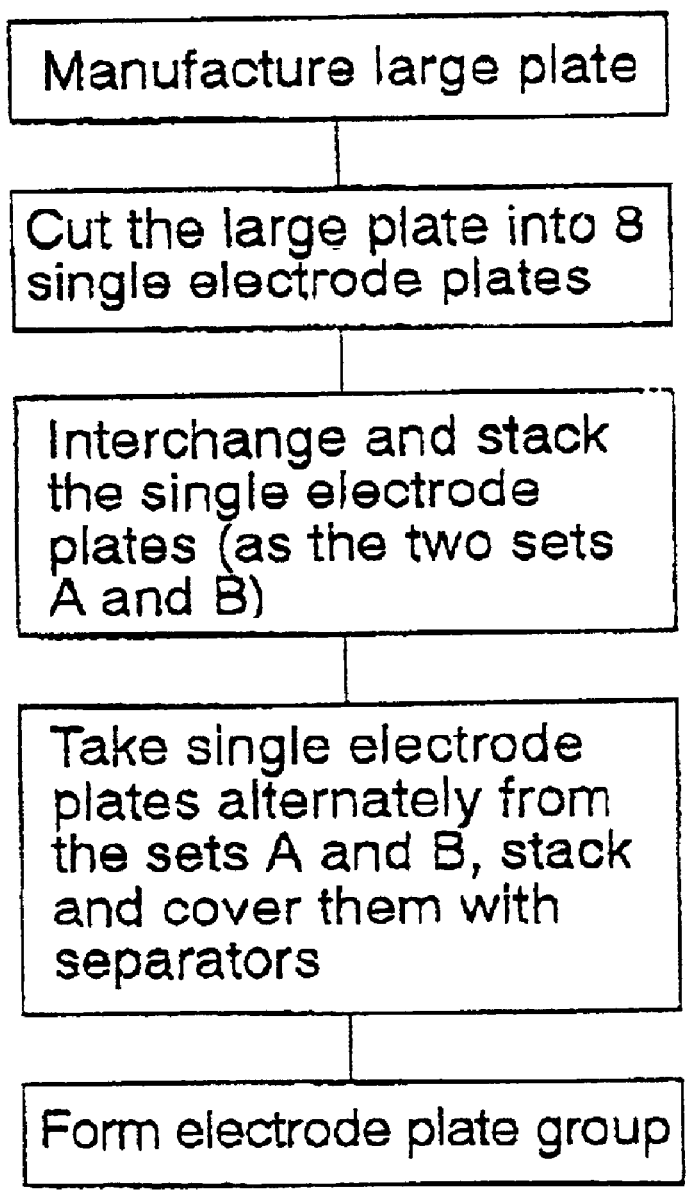
FIG. 1 shows the manufacturing processes for an electrode plate group according to an embodiment of the present invention.
Figure 2:
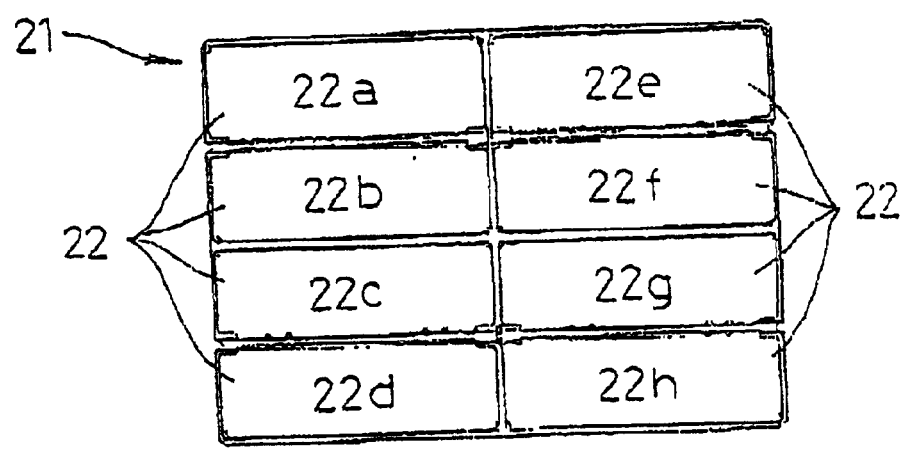
FIG. 2 is a plan view of a large plate used in the present embodiment and single electrode plates that are cut from the large plate.

The process for manufacturing the electrode plate group 8 will be described with reference to FIG. 1. In order to achieve high productivity, a large plate from which a plurality of electrode plates (hereafter, "single electrode plates") that have the right size and shape for forming the electrode plate group 8 are cut is manufactured. As one example, a large plate 21 from which eight single electrode plates can be cut is shown in FIG. 2. These large plates may be manufactured as single sheets, or the large plates may be manufactured as a coiled material in which many plates are joined together, with this material then being cut to appropriate lengths.

Next, the large plate 21 manufactured as described above is subjected to a cutting process where eight single electrode plates 22 are simultaneously cut out from the large plate 21 as shown in FIG. 2. In FIG. 2, each of the eight single electrode plates 22 is given a number 22a to 22h in accordance with its position on the large plate 21. These numbers are used later in this description.

Then, the positional relationship of the eight single electrode plates 22 is maintained, and the single electrode plates 22 are subjected to an interchanging process. After the positions of the single electrode plates 22 have been interchanged, the single electrode plates 22 are successively loaded into single electrode plate holding magazines that are provided corresponding to the positions of the single electrode plates 22.

Figure 3:
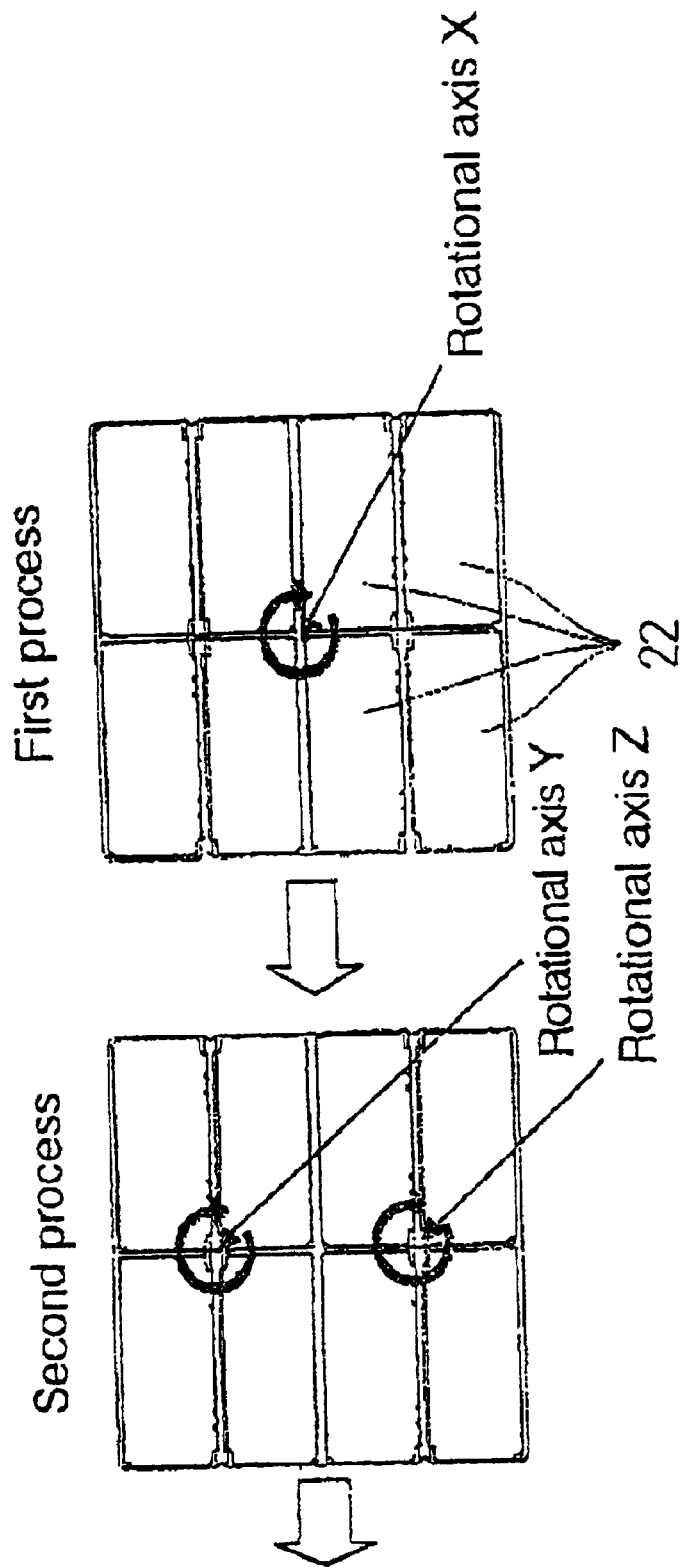
FIG. 3 is a representation of an operation that interchanges the positions of the single electrode plates in the present embodiment.

As shown in FIG. 3, the interchanging process includes a first process, in which a set of eight single electrode plates 22 is supported and are rotated by 180° as necessary about a rotational axis X positioned at the center of the eight single electrode plates 22 and a second process in which the eight single electrode plates 22 are divided into two sets of four single electrode plates 22 and the single electrode plates 22 in one of the sets are rotated by 180° about a rotational axis Y or Z positioned at the center of each set of four single electrode plates 22.

Figure 4:
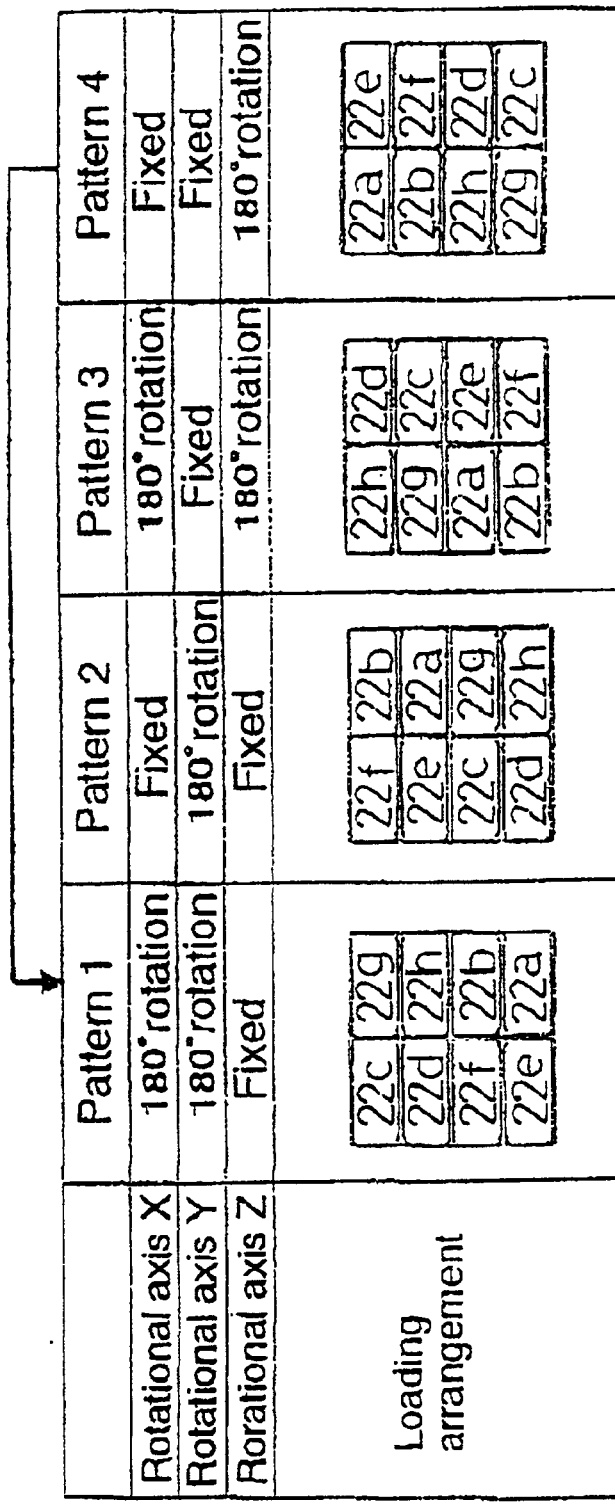
FIG. 4 shows how the single electrode plates are rearranged by the position interchanging process in the present embodiment.

By combining the rotational operations of the first and second processes, there are four patterns for interchanging the positions of the single electrode plates 22, as shown in FIG. 4. As one example, in pattern 1, the set of eight single electrode plates 22 is rotated by 180° about the rotational axis X in the first process, and then rotation is performed about the rotational axis Y but not about the rotational axis Z in the second process. This results in the arrangement shown in FIG. 4.

Figure 5:
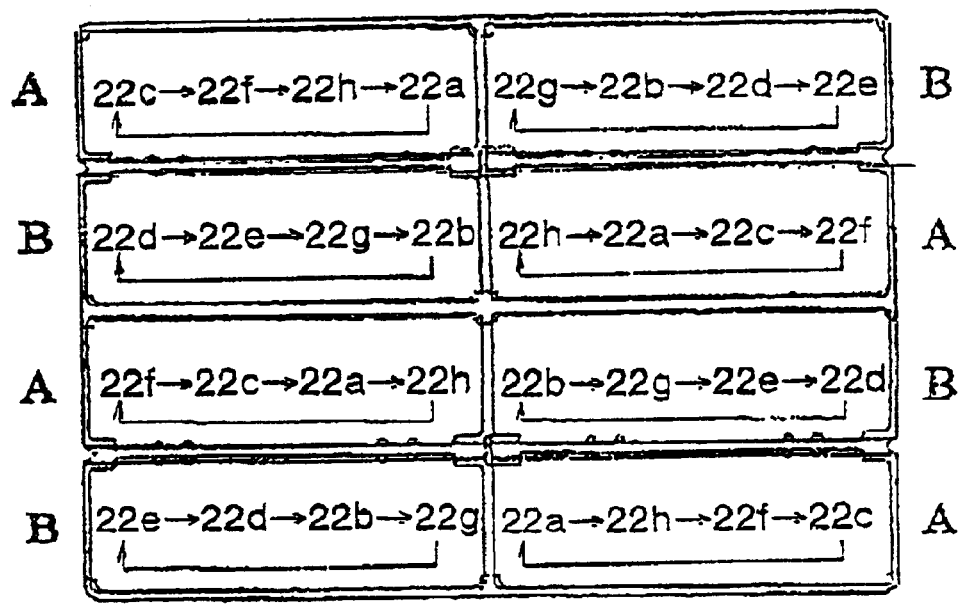
FIG. 5 is a representation of how the single electrode plates are stacked in the present embodiment.

In the interchanging process for the single electrode plates 22, operations that interchange the positions of the single electrode plates 22 according to the patterns 1 to 4 are successively repeated, with the single electrode plates 22 being successively loaded into the single electrode plate holding magazines that are provided corresponding to the positions of the single electrode plates 22. As a result, the single electrode plates 22c, 22f, 22h, and 22a shown in FIG. 2 are repeatedly loaded in that order into the single electrode plate holding magazine provided corresponding to the position of the single electrode plate 22a, as shown in FIG. 5. In the same way, the single electrode plates 22d, 22e, 22g, and 22b shown in FIG. 2 are loaded in that order into the single electrode plate holding magazine provided corresponding to the position of the single electrode plate 22b, as shown in FIG. 5. Here, the single electrode plates 22a, 22c, 22f, and 22h are loaded into the single electrode plate holding magazines provided corresponding to the positions of the single electrode plates 22a, 22c, 22f, and 22h with the order of arrangement of these single electrode plates 22 being changed. Similarly, the single electrode plates 22b, 22d, 22e, and 22g are loaded into the single electrode plate holding magazines provided corresponding to the positions of the single electrode plates 22b, 22d, 22e, and 22g with the order of arrangement of these single electrode plates 22 being changed. Since the single electrode plates 22 loaded into each set of holding magazines is limited, these two sets of single electrode plates 22 are treated as set A and set B.

After this, the single electrode plates that are positive electrode plates are covered with separators and are loaded in a positive electrode holding magazine. At this point, single electrode plates 22 are taken alternately from the single electrode plate holding magazines for set A and the single electrode plate holding magazines for set B, are covered with separators, and are loaded in the positive electrode holding magazine. In the same way, when preparing the negative electrode plates, single electrode plates 22 are taken alternately from the single electrode plate holding magazines for set A and the single electrode plate holding magazines for set B and are loaded in the negative electrode holding magazine.

Then, single electrode plates 22 are taken alternately from the positive electrode holding magazine and the negative electrode holding magazine and a predetermined number of each kind of electrode plates are stacked to form an electrode plate group.

The following battery modules were produced: a prismatic battery module including a plurality of electrode plate groups manufactured in accordance with the method for manufacturing described above; a prismatic battery module including a plurality or electrode plate groups in each of which electrode plates are not alternated between the set A and the set B; a prismatic battery module that is a comparative example and includes a plurality of electrode plate groups produced without interchanging the single electrode plates; and a prismatic battery module that is a related art example and includes a plurality of electrode plate groups that was manufactured by sorting the single electrode plates according to weight. The variation in capacity of cells in each battery module was measured and the results are given in Table 1 below.

TABLE 1

|  | Example 1 | Example 2 | Comparative Example | Related Art |
|---|---|---|---|---|
| Sorting by weight? | No | No | No | Yes |
| Interchanging of plates? | Yes | Yes | No | No |
| Alternate Set A and Set B? | Yes | No | No | No |
| Variation in capacity | ±2.1% | ±3.5% | ±7.0% | ±2.0% |

A variation in capacity of ±7.0% was observed for the comparative example where the electrode plate groups are formed without interchanging the single electrode plates. For Example 1, however, the variation in capacity was kept to just ±2.1%, so that variations in capacity are suppressed to a similar extent as the related art with high productivity and at low cost. Note that there is slightly more variation in Example 2 where the single electrode plates are not alternated between the sets A and B.

It should be noted that while the above embodiment is described using an example where the arrangement positions of the single electrode plates are interchanged by successively repeating operations with four patterns that are combinations of a first operation where a set composed of all the single electrode plates is rotated and a second operation where one of two sets of half of the single electrode plates is rotated, this is not a restriction for the present invention. As a more general example, a plurality of single electrode plates cut from a large plate may be divided up into a plurality of types of sets composed of single electrode plates. When performing the operation that interchanges the single electrode plates forming a set by rotating them about a central point, the combination of sets that are rotated and the order used may be successively changed for each large plate. Further, the arrangement positions on the large plate may be set based on a random number table or the like, with the single electrode plates being successively taken and stacked from the set positions.

As should be clear from the above explanation, according to the method for manufacturing an electrode plate group of the invention, when stacking single electrode plates that have been cut from a large plate, single electrode plates from different positions on the large plates grouped together. The resulting sets of single electrode plates have consistent weights, so that if the single electrode plates are taken from the stacked single electrode plates and used to form an electrode plate group, the weights of the resulting electrode plate groups are kept within a predetermined range. Consequently, long-life, high-output prismatic batteries are manufactured at low cost and with high productivity without requiring equipment such as a weight sorting device.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for manufacturing an electrode plate group for a prismatic battery, comprising:

manufacturing a large plate from which a plurality of single electrode plates that form the electrode plate group are cut;

cutting a plurality of single electrode plates from the large plate;

stacking the single electrode plates in a predetermined fashion by grouping together single electrode plates from positions in different areas on the large plates, the stacking configured to achieve a balance in weight between electrode plate groups; and taking the single electrode plates from the stacked single electrode plates successively and alternately stacking the taken single electrode plates with taken single electrode plates of opposite polarity, thereby forming the electrode plate group.

2. The method for manufacturing an electrode plate group for a prismatic battery according to claim 1, wherein the single electrode plates from different positions on the large plate are stacked by:

dividing the plurality of single electrode plates cut from the large plate into a plurality of sets that are each composed of a plurality of single electrode plates, and interchanging positions of the single electrode plates composing at least one set by rotating the single electrode plates about a central point of the set, with a combination of sets that are rotated and an order in which the sets are rotated being successively changed for each large plate.

3. A method for manufacturing an electrode plate group for a prismatic battery, comprising:

manufacturing a large plate from which a plurality of single electrode plates that form the electrode plate group are cut;

cutting a plurality of single electrode plates from the large plate;

stacking the single electrode plates by grouping together single electrode plates from positions in different areas on the large plate; and taking the single electrode plates from the stacked single electrode plates successively and alternately stacking the taken single electrode plates with taken single electrode plates of opposite polarity, thereby forming the electrode plate group, wherein the single electrode plates from different positions on the large plate are stacked by successively repeating operations with four patterns, the four patterns being produced by combining a first operation where a single set composed of all of the single electrode plates are rotated and a second operation where the single electrode plates in one of two sets, which are each composed of half of the single electrode plates, are rotated.

4. The method for manufacturing an electrode plate group for a prismatic battery, wherein single electrode plates are alternately taken from two sets of electrode plates stacked in accordance with the method for manufacturing of claim 3 and are used to form the electrode plate group.

* * * * *